Patented Nov. 23, 1948

2,454,692

UNITED STATES PATENT OFFICE 2,454,692

PREPARATION OF TOCOPHEROL CONCENTRATE

Norris D. Embree and Noel H. Kuhrt, Rochester, N. Y., assignors to Distillation Products, Inc., Rochester, N. Y., a corporation of Delaware No Drawing. Application May 31, 1946, Serial No. 673,616

5 Claims. (Cl. 260—333)

This invention has for its object to provide an improved process for preparing a tocopherol concentrate from deodorizer scum and its partial concentrates by an improved method involving extraction with a liquified normally gaseous hydrocarbon.

In Hickman Patent 2,349,269, May 23, 1944, it is shown that materials volatilized during the vacuum-carrier gas treatment of glyceride oils contain an appreciable amount of tocopherol mixed with a complex group of organic substances, including the odoriferous components of the glycerides. Various methods of separating the tocopherol from this complex mixture were described.

This invention has for its object to provide an improved procedure for separating tocopherol from deodorizer sludge and its partial concentrates. Another object is to provide an improved procedure for separating tocopherol from deodorizer sludge and its partial concentrates which can be used economically in conjunction with the purification methods, described in the above noted Hickman patent. Another object is to provide a simple and economical method for separating tocopherol from deodorizer sludge and partial concentrates thereof. Other objects will appear hereinafter.

These and other objects are accomplished by our invention which includes subjecting deodorizer sludge or partial concentrates thereof to solution in a liquified hydrocarbon followed by one or more of the following processes: (1) neutralization, (2) chilling and (3) extraction at or near the critical point of the hydrocarbon.

In the following examples and description we have given several of the preferred embodiments of our invention but it is to be understood that these are set forth for the purpose of illustration and not in limitation thereof.

The tocopherol can be extracted from the deodorizer sludge or partial concentrate with the liquified normally gaseous hydrocarbon in batch fashion. Thus, the sludge or partial concentrate can be dissolved in the liquified hydrocarbon at ordinary temperature and the mixture then may be raised to the phase point temperature sometimes referred to as the critical solution temperature, i. e., a temperature approximating the critical temperature of the liquified normally gaseous hydrocarbon where separation into two phases takes place. The liquified hydrocarbon phase has a lower specific gravity than the deodorizer sludge and it is separated from the top of the apparatus. The tocopherol will be concentrated either in the upper or lower phase depending upon the composition of the accompanying fatty matter. The two phases are withdrawn and treated to recover the solutes contained therein. This may be accomplished by releasing the pressure and permitting the hydrocarbon to vaporize.

We prefer to contact the deodorizer sludge or partial concentrate with the liquified hydrocarbon in a counter-current continuous matter at or near the phase point temperature. When separated in this way the sludge or partial concentrate is introduced near the top of the continuous extraction system and the liquified normally gaseous hydrocarbon is introduced near the bottom of the extraction system. The two liquids pass counter-current to each other. The hydrocarbon solution of the soluble constituents contained in the sludge passes upwardly and is separated from the top of the column while the extracted sludge containing some dissolved liquified hydrocarbon is removed from the bottom of the column. Those constituents of the solute with phase point temperatures above the temperature employed in the extraction system will tend to pass upward and be separated from the top of the column while those constituents of the solute with phase point temperatures below that employed in the system will tend to be concentrated at the bottom of the column and are removed. A portion of the separated solute may be returned to the column to serve as reflux. The simplest type of contacting equipment, such as a high pressure packed tower can be employed. The sludge or partial concentrate is preferably introduced in a heated condition so that the mixture in the counter-current contact tower will be at the phase point temperature. However, the column can be heated to the phase point temperature or a temperature gradient may be maintained if desired and the constituents introduced at a lower temperature. All the foregoing operations are carried out under super-atmospheric pressure sufficient to maintain the hydrocarbon in the liquid phase. This pressure depends on the particular hydrocarbon used and the proportions of solvent to sludge or partial concentrate. Pressures of about 450 to 500 pounds per square inch are usually employed.

While we prefer to employ propane in the process, other liquified normally gaseous hydrocarbons, such as ethane, propylene, butanes, butene, cyclo propane and cyclo butane may be used. These hydrocarbons have the property of dissolving the deodorizer sludge or partial concentrate at low temperatures but when heated to the phase point temperature, which usually approximates the critical temperature of the hydrocarbon, two liquid phases separate out, one of which contains a part of the tocopherol in a concentrated form and which can be separated as described. When separating with a batch process the liquified hydrocarbon can be mixed with the sludge at low temperatures, such as about 15 to 40° C. and the mixture then heated to the phase point temperature and the hydrocarbon phase separated. The phase point temperature will vary with the particular hydrocarbon used and the amount of solvent. Also, deodorizer sludges vary somewhat in composition, depending upon the particular type of vacuum-carrier gas treatment used and the oil to which it is applied. However, the phase point temperature will, in general, approximate the critical temperature of the of the hydrocarbon. For instance, with propane and crude deodorizer sludge and a propane to sludge ratio of 4 to 1 the phase point temperature is 88° C. Under the same conditions but with a partial concentrate obtained by high vacuum unobstructed path distillation of deodorizer sludge the phase point is 82°. Winterizing the partial concentrate obtained by high vacuum unobstructed path distillation results in a product with a phase point of 78°. The ratio of sludge or partial concentrate to liquified hydrocarbon can vary considerably as a general proposition. One part of sludge or partial concentrate to 2 to 12 parts of liquified hydrocarbon will be found most useful.

The extraction treatment is complementary to purification by high vacuum unobstructed path distillation. Thus, these two methods will result in a separation which would be impossible with either method used alone. For this reason it is advantageous to subject the deodorizer sludge to high vacuum unobstructed path distillation to separate a tocopherol concentrate and then subject this partial concentrate to the extraction with a liquified hydrocarbon. Alternatively, it may be advantageous to extract with the liquified hydrocarbon first and then subject the concentrate thus produced to high vacuum unobstructed path distillation.

The deodorizer sludge and partial concentrates thereof contain large amounts of free fatty acids and we have found that there is a definite advantage in neutralizing these free fatty acids while in solution in the liquified hydrocarbon. The neutralizing alkali may be added to the solution at ordinary temperature and the soaps of the fatty acids will be rapidly precipitated out of the solution without carrying down an appreciable amount of the oil contained in the sludge or partial concentrate. This leaves a concentrated solution which can be further worked up by extraction of the tocopherol as explained above or by high vacuum unobstructed path distillation, saponification, etc. There is also a definite advantage in cooling the solution of petroleum hydrocarbon containing either the extracted phase or the deodorizer sludge or partial concentrate. This results in a precipitation of the saturated components, such as sterols, saturated fatty acids, and glycerides and results in a higher potency concentrate after the solution is removed from the precipitate. While this expedient is applicable to the crude deodorizer sludge, a partial concentrate thereof and the liquified hydrocarbon extract, it is most advantageously applied to the original starting solution prior to the extraction. The removal of high melting materials is preferably applied to sludge or partial concentrates from which the fatty acids have been removed. This will avoid mixing fatty acids with the sterols and other high melting products. The fatty acids can be previously removed by high vacuum distillation, by neutralization in liquified hydrocarbon solution, or by extraction with liquified hydrocarbon at the phase point. After the saturated components have been separated as described the mixture can be worked as desired. For instance it can be heated to the phase point temperature where the solution will separate into two phases, the upper phase being separated to recover the tocopherol concentrate or it can be treated to remove the solvent and subjected to molecular distillation. Extreme cooling to precipitate is not necessary, temperatures of minus 10 to 0° C. being satisfactory. Lower temperatures, such as about minus 40° C. may be necessary in some cases, depending upon the amount of saturated components contained in the starting material and the degree of separation desired.

*Example 1*

The separation by continuous countercurrent extraction of deodorizer sludge with propane at temperatures near the critical point of this solvent varies according to the details of the procedure used and the nature of the sludge or partial concentrate used. To illustrate the possible processes which would be feasible we have determined the phase points for the major fractions of a deodorizer sludge at concentrations of approximately 20 to 30% solute. This range of concentrations was chosen since within it there is little change of phase-point temperature with concentration. The phase points are:

| Fraction | Phase Point, °C. |
| --- | --- |
| Tocopherol | 80 |
| Sludge fatty acids | 101 |
| Sludge "alcohol and ester" fraction | 107 |
| Sludge sterols | (insoluble) |
| Sludge "high molecular weight fraction" | 76 |

These can be compared with the phase point data presented by Hixson and Bockelmann (Transactions of the American Institute of Chemical Engineers, volume 38, page 891):

| Fraction | Phase Point, °C. |
| --- | --- |
| Oleic acid | 90.5 |
| Refined cottonseed oil | 66.3 |

Hixson and Bockelmann show that the oleic acid in cottonseed oil can be separated by countercurrent extraction with propane at temperatures near the critical point of this solvent. It is seen that by comparing the differences in temperature of the phase points for the sludge fractions that the fatty acids fraction and "alcohol and ester" fraction have compatibilities with propane considerably different than that of tocopherol. Therefore, these materials can be separated from tocopherol with comparative ease. The tocopherol and the high molecular weight fraction have only slightly different compatibilities with propane. By using long extraction towers, they can be separated, but we find that molecular distillation is better for this purpose. The tocopherol can be separated from the sterols readily by extraction with propane, but, in general, it is better to use the chilling process described in Example 4 for this purpose.

Example 2

A partial neutralization of the fatty acids in sludge was carried out at 70° F. by the following procedure: 5 grams of crude sludge containing 3.0% tocopherol and having an acid value of 127 was dissolved in 40 cc. of propane and mixed with 8 cc. of 2 N sodium hydroxide. The mixture was filtered and the granular soap washed with 10 cc. of propane. Evaporation of the filtrate yielded 2.2 g. of oil with a tocopherol content of 6.4% and an acid value of 20.

Example 3

The complete neutralization of the fatty acids in crude sludge is illustrated by the following example: 1.25 grams of crude sludge with a tocopherol content of 3.0% and an acid value of 127 was dissolved in 50 cc. of propane and mixed with 2 cc. of 2 N sodium hydroxide at 70° F. The precipitated soaps were washed with 30 cc. of propane and the oil recovered from the combined filtrates weighed 0.60 g. and had a tocopherol content of 6.6% and an acid value of 0.0.

Example 4

The removal of high melting materials from the partial concentrate from sludge made by distillation was carried out in the following manner: 15 grams of a partial concentrate made by molecular distillation, which contained 9.3% tocopherol, was dissolved in 50 cc. of propane at 80° F. The mixture was chilled to $-10°$ C., was filtered and the filter cake washed with 30 cc. of propane. The combined filtrates yielded 12 grams of a clear, bright oil containing 12.4% tocopherol, while the filter cake after removal of the propane yielded 3.0 grams of a solid wax-like material containing 5.6% tocopherol. The temperature at which the chilling of the solution is done can be chosen to give the desired fraction of precipitate. If the temperature is below $-60°$ C., there may be considerable losses of tocopherol due to its partial solidification. For example, when a purified tocopherol concentrate preparation containing 90% was dissolved in 30 times its volume of propane and chilled to $-65°$ C., there was precipitated .55 part in the form of a gel which contained about 55% of the original tocopherol.

What we claim is:

1. The process of preparing a tocopherol concentrate from deodorizer sludge and similar material obtained in the gas carrier treatment of tocopherol-containing glyceride oils which comprises dissolving the sludge in a liquefied normally gaseous hydrocarbon, heating the resulting solution to its phase point temperature, whereby there is produced a hydrocarbon liquid phase rich in tocopherol and another liquid phase less rich in tocopherol, separating the tocopherol-rich phase from the phase less rich in tocopherol and removing the hydrocarbon from the tocopherol-rich phase.

2. The process of preparing a tocopheral concentrate from deodorizer sludge and similar material obtained in the gas carrier treatment of tocopherol-containing glyceride oils which comprises extracting the sludge with a liquefied normally gaseous hydrocarbon at approximately the phase point temperature of the hydrocarbon solution of tocopherol thus formed, whereby to obtain a tocopherol-rich hydrocarbon liquid phase, and thereafter separating the hydrocarbon from said liquid phase.

3. The process of preparing a tocopherol concentrate from deodorizer sludge and similar material obtained in the gas carrier treatment of tocopherol-containing glyceride oils which comprises subjecting the sludge to continuous counter-current liquid extraction with a liquefied normally gaseous hydrocarbon at approximately the phase point temperature of the hydrocarbon solution of tocopherol thus formed, whereby to obtain a tocopherol-rich hydrocarbon liquid phase, and thereafter separating the hydrocarbon from said liquid phase.

4. The process of preparing a tocopherol concentrate from deodorizer sludge and similar material obtained in the gas carrier treatment of tocopherol-containing glyceride oils which comprises dissolving the sludge in liquefied propane, heating the resulting solution to its phase point temperature, whereby there is produced a liquid propane phase rich in tocopherol and another liquid phase less rich in tocopherol, separating the tocopherol-rich phase from the phase less rich in tocopherol and removing the propane content of the tocopherol-rich phase.

5. The process of preparing a tocopherol concentrate from deodorizer sludge and similar material obtained in the gas carrier treatment of tocopherol-containing glyceride oils which comprises extracting the sludge with liquefied propane at approximately the phase point temperature of the solution thus formed, whereby to obtain a tocopherol-rich liquid propane phase, and thereafter separating the propane content from said liquid phase.

NORRIS D. EMBREE.
NOEL H. KUHRT.

REFERENCES CITED

The following references are of record in the file of this patent:

UNITED STATES PATENTS

| Number | Name | Date |
| --- | --- | --- |
| 2,317,353 | Baxter | Apr. 27, 1943 |
| 2,349,275 | Hickman | May 23, 1944 |

OTHER REFERENCES

Hixson et al., Trans. Amer. Instit. of Chem. Eng., vol. 38, pages 891–930 (1942).